US007127140B2

(12) United States Patent
Kobayashi et al.

(10) Patent No.: US 7,127,140 B2
(45) Date of Patent: Oct. 24, 2006

(54) FIBER BRAGG GRATING DEVICE

(75) Inventors: Shuko Kobayashi, Kanagawa (JP); Akihiko Nishiki, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 11/287,227

(22) Filed: Nov. 28, 2005

(65) Prior Publication Data

US 2006/0115195 A1 Jun. 1, 2006

(30) Foreign Application Priority Data

Nov. 30, 2004 (JP) ............................ 2004-345146

(51) Int. Cl.
*G02B 6/34* (2006.01)
*H04J 14/02* (2006.01)

(52) U.S. Cl. .................. 385/37; 385/1; 385/3; 385/14; 385/8; 385/10; 398/84; 398/87

(58) Field of Classification Search .................... 385/1, 385/3, 14, 37, 8, 10, 129, 130, 131, 132; 398/82, 87, 84
See application file for complete search history.

(56) References Cited

U.S. PATENT DOCUMENTS 6,628,864 B1 * 9/2003 Richardson et al. .......... 385/37
7,050,676 B1 * 5/2006 Adachi et al. ................ 385/37
2002/0197012 A1 * 12/2002 Liu et al. ...................... 385/37
2002/0197013 A1 * 12/2002 Liu et al. ...................... 385/37
2004/0264965 A1 * 12/2004 Kobayashi et al. ........... 398/78
2006/0115195 A1 * 6/2006 Kobayashi et al. ............ 385/1

OTHER PUBLICATIONS

P. Petropoulos et al., "Demonstration of a 64-Chip OCDMA System Using Superstructured Fiber Gratings and Time-Gating Detection", IEEE Photonics Technology Letters, vol. 13, No. 11, Nov. 2001, pp. 1239-1241.

M. R. Mokhtar et al., "Reconfigurable Multilevel Phase-Shift Keying Encoder-Decoder for All Optical Networks", IEEE Photonics Technology Letters, vol. 15, No. 3, Mar. 2003, pp. 431-433.

Andreas Othonos et al., "Fiber Braggs Gratings", Artec House, 1999, pp. 98-99.

* cited by examiner

*Primary Examiner*—Brian M. Healy
(74) *Attorney, Agent, or Firm*—Venable, LLP; James R. Burdett

(57) ABSTRACT

There is provided a fiber Bragg grating devise comprising an FBG mount that is constituted by sequentially stacking a temperature control plate, a base plate, and a mounting plate, and an SSFBG in which a plurality of FBG units of the same constitution and a plurality of phase modulation portions are alternately formed in the same optical fiber. The temperature control plate is constituted by a thermo module and a heat-insulating member. The base plate is fixed in contact with the upper face of the temperature control plate and the mounting plate is in contact with the upper face of the base plate in a state where the mounting plate is able to glide over the upper face of the base plate. The SSFBG is fixed to contact an FBG contact portion that is established on the upper face of the mounting plate. The phase modulation portions are formed to be capable of expanding and contracting and, as a result of the expansion and contraction of the phase modulation portions, the phase of the carrier wave of the optical pulse signal that is propagated by the phase modulation portions can be changed.

10 Claims, 8 Drawing Sheets

Optical Pulse Train Generator
12
13
Modulated Signal Generator
14
15
Optical Modulator
16
17
18
17
21
Encoder
20
10
21
50
38
21
31
Decoder
40
31
O/E Converter
36
37
30

100
113
111
110
115
143
163
165
161
170
133
123
121
125
120
132
135
145
112
117
141
160

A
A
147
111
163
143
165
145
170
141
161
135
160

166a
166b
160
167
168
169
170
168a
168b
168c
168d
168e
168f
168g
168h
168i
168j
168k
168l
168m
168n
168o
169a
169b
169c
169d
169e
169f
169g
169h
169i
169j
169k
169l
169m
169n
170a
170b
170c
170d
170e
170f
170g
170h
170i
170j
170k
170l
170m
170n
$\frac{N\lambda}{2}$ 160
136
137
139
138
138o
139n
138n
139m
138m
139l
138l
139k
138k
139j
138j
139i
138i
139h
138h
139g
138g
139f
138f
139e
138e
139d
138d
139c
138c
139b
138b
139a
138a
123
121
123
125
133

FIBER BRAGG GRATING DEVICE

BACKGROUND OF THE INVENTION

1. Field of the Invention

The present invention relates to a fiber Bragg grating device and, more particularly, to a fiber Bragg grating device that is used as an encoder and a decoder in optical code division multiplexing transmission.

2. Description of Related Art

In recent years, the demand for communication has been increasing at high speed as a result of the popularization of the Internet. Accordingly, high-speed and large-capacity optical networks that employ optical fiber or the like have been developed. In such optical networks, wavelength division multiplexing (WDM) methods are indispensable, there being a particular focus on so-called Dense WDM (DWDM) methods in which wavelength-multiplexing is performed at high densities on the wavelength axis by narrowing wavelength intervals of optical carrier waves allocated to each channel.

In addition to WDM methods or DWDM methods, transmission methods tend to focus on transmission using optical code division multiplexing (OCDM). According to OCDM transmission, transmission is carried out as follows. On the transmission side, optical pulse signals of a plurality of channels are generated in parallel, and the optical pulse signals are modulated (encoded) by means of code that is different for each channel. On the reception side, the modulated optical pulse signals are restored (decoded) to the original parallel optical pulse signals by means of the same code as that used when the optical pulse signals were encoded on the transmission side. Here, an optical pulse signal is an optical pulse train that is rendered by reflecting binary digital electrical pulse signals and that is obtained by subjecting an optical pulse train to optical modulation. Meanwhile, the expression 'optical pulse train' is employed when referring to an optical pulse train in which optical pulses are lined up at regular fixed time intervals.

In order to contribute to an understanding of the fiber Bragg grating (FBG) device of the present invention, a representative constitution of the OCDM transmission device will first be described with reference to the block constitution shown in FIG. 1.

The OCDM transmission device comprises a transmission portion 10 and reception portion 30 that are connected by a transmission line 50.

The transmission portion 10 is constituted comprising an optical pulse train generator 12, a modulated signal generator 14, an optical modulator 16, a first optical circulator 18 and an encoder 20.

The optical pulse train generator 12 generates an optical pulse train (shown by an arrow 13 in FIG. 1). The modulated signal generator 14 supplies information that is to be transmitted to the optical modulator 16 as a binary digital electrical pulse signal (shown by an arrow 15 in FIG. 1). The optical modulator 16 subjects the optical pulse train 13 to optical modulation to generate an optical pulse signal (shown by an arrow 17 in FIG. 1) that reflects a binary digital electrical pulse signal 15. The optical pulse signal 17 generated by the optical modulator 16 enters the encoder 20 via the first optical circulator 18. The encoder 20 generates a transmission signal (shown by an arrow 21 in FIG. 1) by encoding the optical pulse signal 17. A transmission signal 21 is sent to the transmission line 50 via the first optical circulator 18 and then sent to the reception portion 30 after being propagated by the transmission line 50.

The reception portion 30 is constituted comprising a second optical circulator 38, decoder 40, and O/E converter 36.

The transmission signal 21 that is transmitted through propagation via the transmission line 50 enters the decoder 40 via the second optical circulator 38. The decoder 40 generates an optical pulse signal (shown by an arrow 31 in FIG. 1) by decoding the transmission signal 21. The optical pulse signal 31 enters the O/E converter 36 via the second optical circulator 38 and is restored as a binary digital electrical pulse signal (shown by arrow 37 in FIG. 1) by the O/E converter 36. That is, the binary digital electrical pulse signal 15, which is information to be transmitted, is propagated via the transmission line 50 as an optical pulse signal 21 and then restored as a result of becoming a binary digital electrical pulse signal 37 in the reception portion 30.

Transmission using OCDM makes it possible to transmit optical pulse signals of a multiplicity of channels at the same time and the same wavelength. Further, transmission using OCDM is a method that uses the same code as a key on the transmission side and reception side, whereby highly stable or safe transmission is obtained.

Phase code system OCDM that employs the phase of light as code is known as OCDM encoding means (see, for example, DOCUMENT 1: P. Petropoulos et al. "Demonstration of a 64-chip OCDMA System Using Superstructured Fiber Gratings and Time-Gating Detection", IEEE Photonic Technology Letters, Vol. 13, No. 11, November 2001, pp. 1239–1241). More specifically, an FBG device comprising a superstructured fiber Bragg grating (SSFBG) is used as the encoder 20 and decoder 40. The SSFBG comprises a plurality of fiber Bragg gratings (known as 'FBG units' hereinafter) with the same constitution in the core of the optical fiber.

With an SSFBG, it can be assumed that the phase difference (known as a 'relative phase difference' hereinafter) of the reflected light in adjacent FBG units is 0 or π as a result of establishing the interval between adjacent FBG units. For example, when encoding is performed by means of a 15-bit code array '0, 0, 0, 1, 1, 1, 1, 0, 1, 0, 1, 1, 0, 0, 1', the phase of reflected light in the first to fifteenth FBG units is set as '0, 0, 0, π, π, π, π, 0, π, 0, π, π, 0, 0, π' by establishing the interval for adjacent FBG units. Further, in the case of decoding, the arrangement of FBG units in SSFBG is the same as the arrangement for encoding but the light input and output terminals are reversed with respect to the encoder.

In the OCDM encoder and decoder of the conventional example above, the code that is employed in encoding and decoding, that is, the interval between adjacent FBG units is fixed. As a result, to change the code, a set of the encoder and decoder showed be replaced by a new one set. Therefore, as means for converting or changing the code constituting the OCDM encoder and decoder, a phase encoder that regulates the phase shift amount and optionally sets the code by causing a plurality of tungsten wires to touch the SSFBG at fixed intervals and adjusting the interval between adjacent FBG units through localized heating using respective tungsten wires has been tested (see, for example, DOCUMENT 2: M. R. Mokhtar et al., "Reconfigurable Multilevel Phase-Shift Keying Encoder-Decoder for All-Optical Networks", IEEE Photonics Technology Letters, Vol. 15, No. 3, March 2003, pp. 431 to 433).

However, with the OCDM encoder and decoder appearing in the DOCUMENT 2, when a long time passes after setting the code, the heating area increases as a result of thermal conductivity on the optical fiber. When the heating area increases, the phase shift differs from the desired value, that is, there is the problem that decoding can no longer be performed because the code is different.

Further, when the temperatures of the environment in which the encoder and decoder are installed are different or the environmental temperatures fluctuate, the reflection wavelengths of the encoder and decoder are then different. In OCDM transmission, when there is a wavelength difference of a few picometer (pm) between the reflection wavelengths of the encoder and decoder established with the same code, encoding and decoding cannot be favorably performed.

The present invention was conceived in view of the above problem. An object of the present invention is to provide a fiber Bragg grating device that is used as an OCDM encoder and decoder that is capable of implementing code changes by means of a low-cost and simple constitution, which allows a phase shift to hold the desired value even after a long time has passed and which permits adjustment of reflection wavelengths.

SUMMARY OF THE INVENTION

In order to achieve the above object, according to an aspect of the present invention, there is provided a fiber Bragg grating device comprising an FBG mount that is constituted by sequentially stacking a temperature control plate, a base plate, and a mounting plate; and an SSFBG in which a plurality of fiber Bragg grating (FBG) units of the same constitution and a plurality of phase modulation portions are alternately formed in the same optical fiber.

The temperature control plate is constituted by a thermo module and heat-insulating member. The base plate is fixed in contact with the upper face of the temperature control plate. The mounting plate is in contact with the upper face of the base plate in a state where the mounting plate is able to glide over the upper face of the base plate.

The SSFBG is fixed to contact an FBG contact portion that is established on the upper face of the mounting plate. The phase modulation portions are formed to be capable of expanding and contracting. As a result of the expansion and contraction of the phase modulation portions, the phase of the carrier wave of the optical pulse signal that is propagated by the phase modulation portions can be changed.

According to a preferred embodiment of the present invention, the optical path length of the phase modulation portions is set at a first length L1 provided by the following equation (1) and is capable of expanding to a second length L2 provided by the following Equation (2).

$$L1=m\lambda/2 \qquad \text{Equation (1):}$$

$$L2=L1+(2n-1)\lambda/4, \qquad \text{Equation (2):}$$

where m and n are positive integers and λ is the wavelength of the carrier wave of the optical pulse signal propagated by the SSFBG.

In addition, according to another preferred embodiment of the present invention, the phase modulation portions each comprise a local heater that changes the optical path length of the phase modulation portions; and the phase modulation portions expand and contract as a result of the heating and non-heating by the local heaters.

The fiber Bragg grating device of the present invention permits changes to the optical path length of the phase modulation portion, that is, to the phase of the carrier wave of the optical pulse signal propagated by the phase modulation portion by means of the heating and non-heating of a local heater and, therefore, the code can be easily changed without exchanging the encoder and decoder themselves.

Furthermore, according to another preferred embodiment of the present invention, a temperature control plate is provided and the SSFBG is provided in contact with the mounting plate the temperature of which is controlled by the temperature control plate. As a result, in the SSFBG, an increase in the heating area due to the heating by the local heater can be suppressed. Hence, encoding and decoding characteristics can be provided stably for a long period on the basis of the code thus established. Further, even when the temperatures of the environments where the encoder and decoder are installed are different or the environment temperatures fluctuate, the wavelength is not affected.

Further, according to another preferred embodiment of the present invention, it is preferable that the FBG contact portion be provided as a V-shaped groove in the upper face of the mounting plate, a local heater groove be provided in the upper face of the mounting plate and in the groove face of the V-shaped groove, the local heater be provided in the local heater groove, and the SSFBG be provided to contact the groove face of the V-shaped groove.

Furthermore, according to another preferred embodiment of the fiber Bragg grating device of the present invention, the mounting plate is constituted by a plurality of mounting stages comprising the FBG contact portion established in the upper face of the plurality of mounting stages and by expansion and contraction stages provided interposed between the mounting stages. The FBG unit is fixed to contact the FBG contact portion, and the phase modulation portions, which are not fixed to the expansion and contraction stages, expand or contract as a result of the expansion and contraction of the expansion and contraction stages.

In this case, because the optical path length of the phase modulation portion can be changed by means of the heating and non-heating of the voltage to the expansion and compression stage, the code can be easily changed without exchanging the encoder and decoder.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

Embodiments of the present invention will be described hereinbelow with reference to the drawings. However, such embodiments only serve to schematically illustrate the constitution and dispositional relationship of the respective constituent elements to an extent permitting an understanding of the present invention. Further, although suitable examples of the present invention will be described hereinbelow, the quality and numerical conditions and so forth of the respective constituent elements are only suitable examples. Therefore, the present invention is not limited to or by the following embodiments.

Constituent elements that are the same in each of the drawings are shown with the same numbers assigned thereto, whereby repetition is also avoided in the description. Further, the drawings, which serve to illustrate the structure of the FBG device, reflect a priority to simplify the illustration and have parts for which strictness has been sacrificed in areas where there is no misunderstanding of the meaning of the present invention in situations where there is a geometric overlap in the depth direction of the drawings and so forth. Further, hatching to indicate a cross-section and so forth is partially omitted.

First Embodiment

Figure 1:
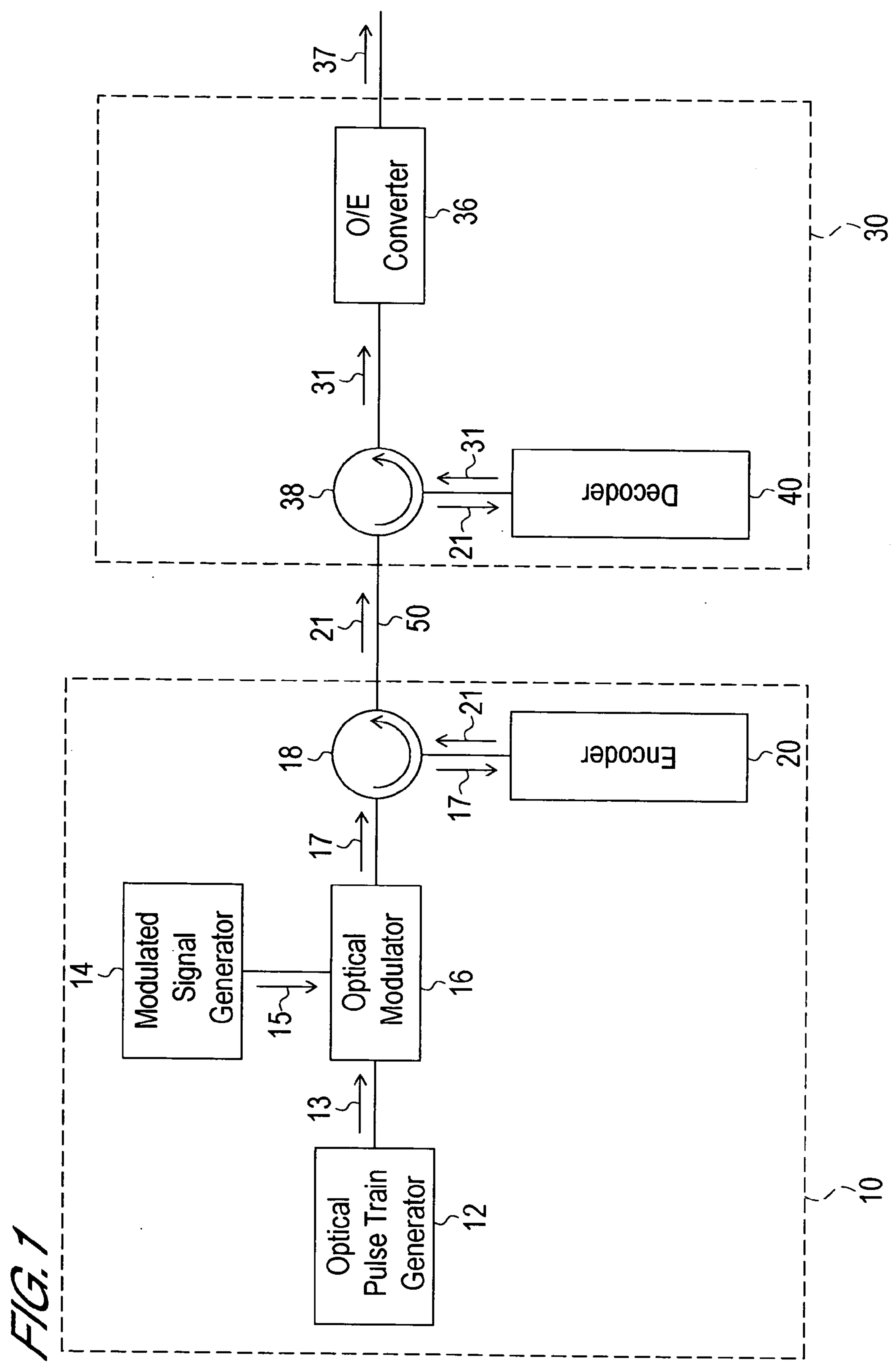
FIG. 1 is a block constitutional view of an optical code division multiplexing transmission device.
Figure 2:
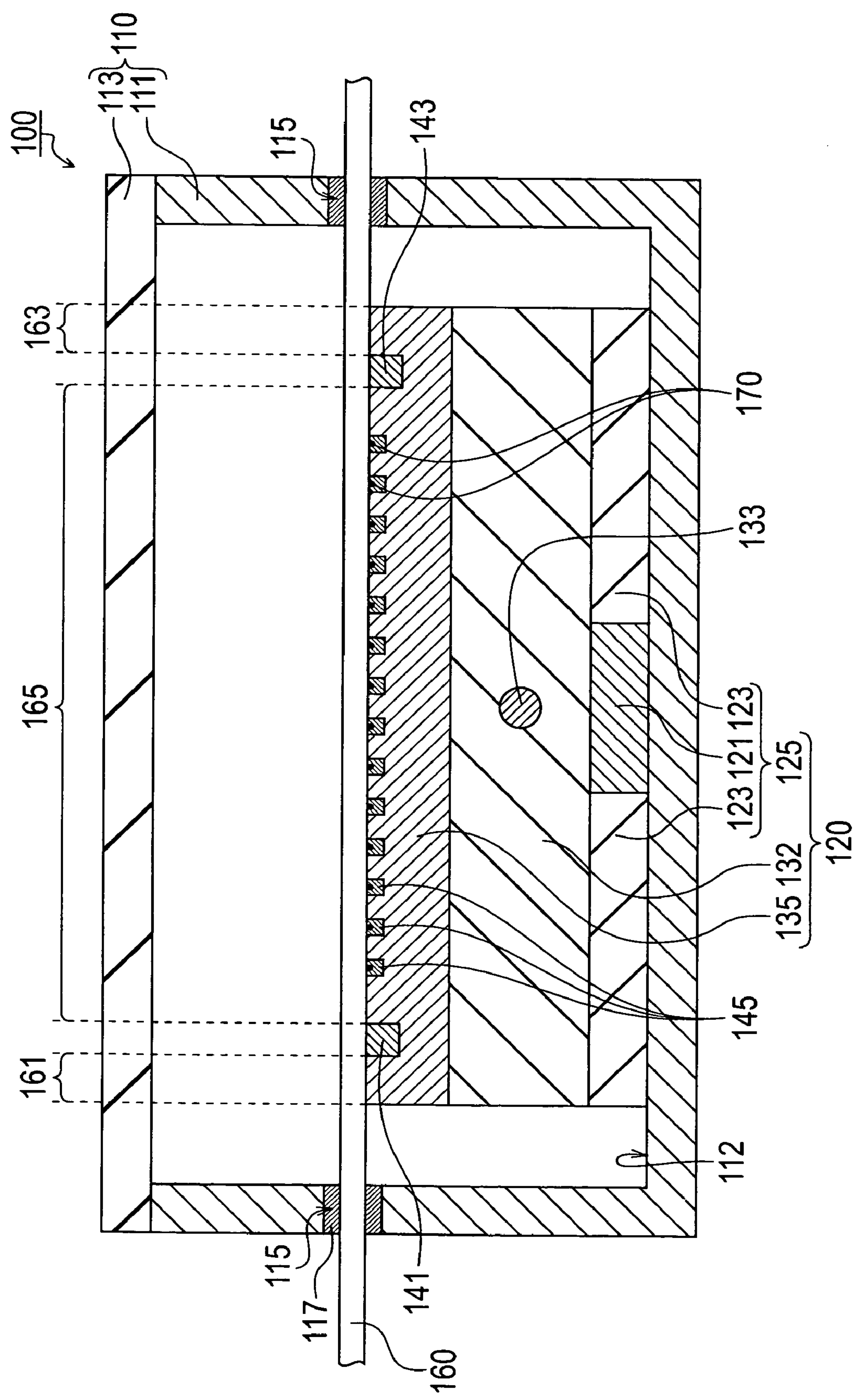
FIG. 2 is a schematic cross-sectional view of an FBG of a first embodiment.
Figure 3:
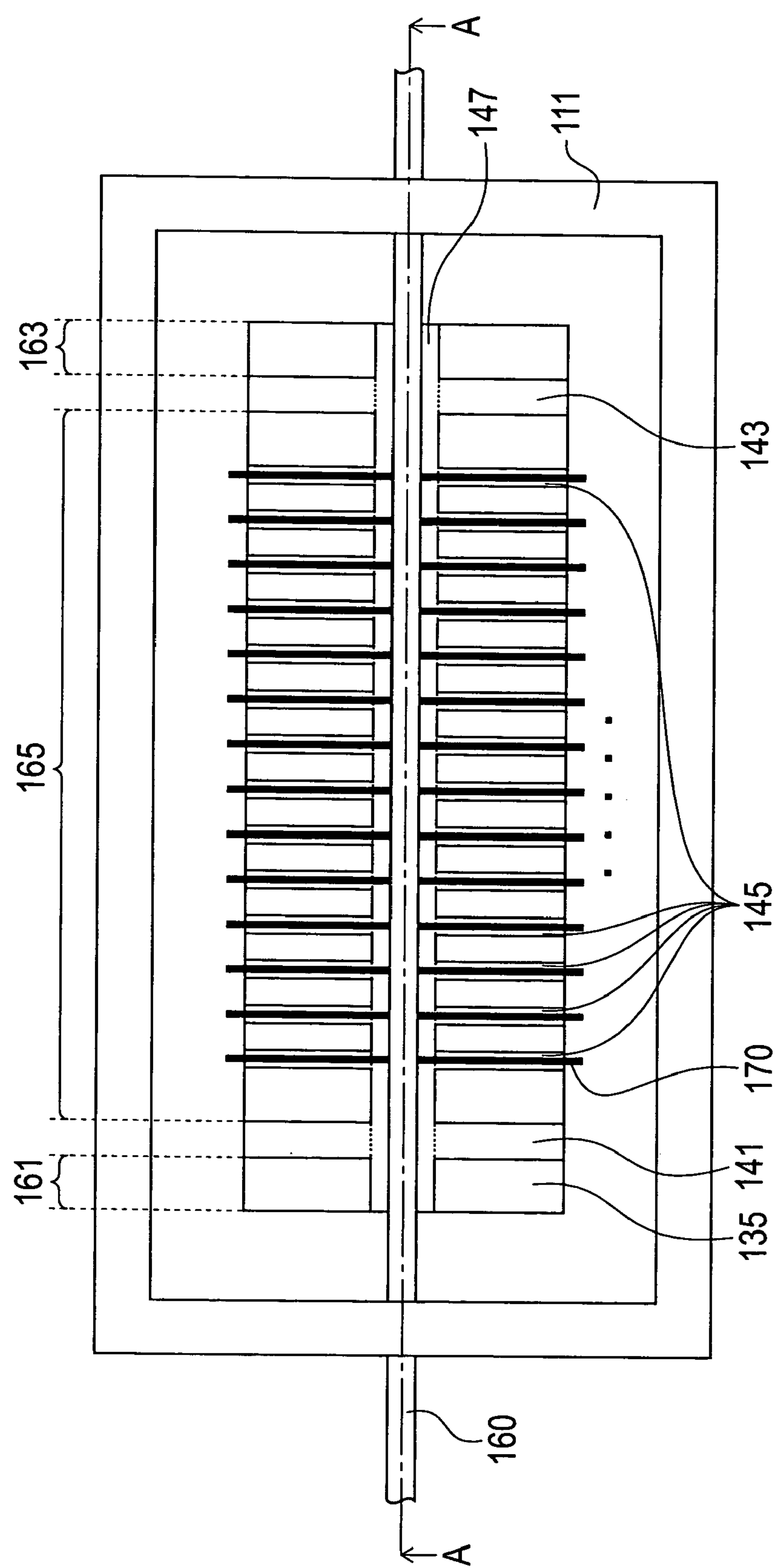
FIG. 3 is a schematic planar view of the FBG device of the first embodiment.
Figure 4:
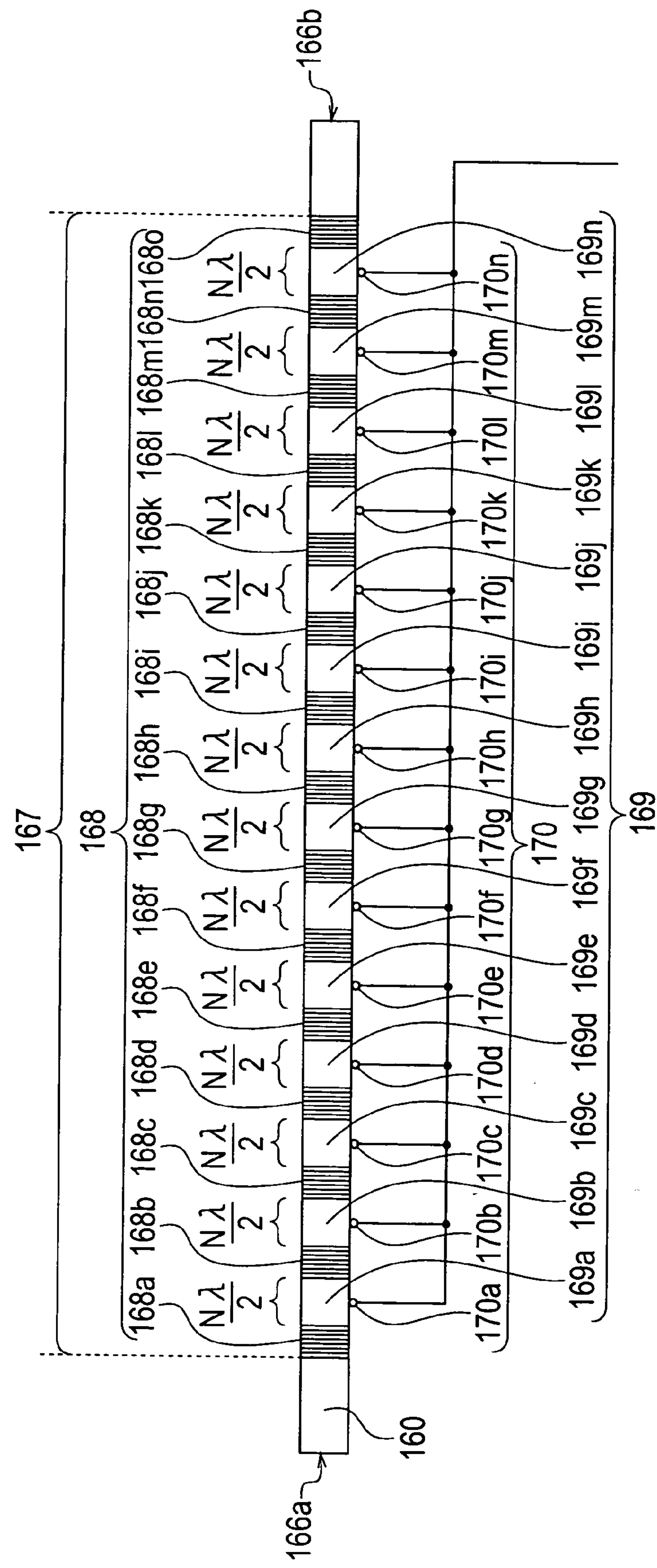
FIG. 4 is a schematic diagram of the constitution of an SSFBG of the first embodiment.

The constitution of the FBG device of a first embodiment of the present invention will now be described with reference to FIGS. 2, 3, and 4. FIG. 2 is a schematic cross-sectional view in which the FBG device of the first embodiment is viewed from the side, and FIG. 3 is a schematic planar view in which the FBG device of the first embodiment is viewed from above. Further, FIG. 2 shows a cross-section along the line A—A in FIG. 3. FIG. 4 is a schematic diagram serving to illustrate the constitution of the SSFBG of the first embodiment.

An FBG device 100 comprises an FBG mount 120 that is constituted by sequentially stacking a temperature control plate 125, a base plate 132, and a mounting plate 135. The FBG mount 120 is installed fixed to a base bottom face 112 of the FBG device enclosure 110. The FBG device enclosure 110 is a constitution in which an FBG device base portion 111 is covered by an FBG device enclosure cover 113.

The schematic planar view in which the FBG device is viewed from above shown in FIG. 3 shows a state where the FBG device enclosure cover 113 has been removed. Such a structure permits consideration of the work of installing the FBG mount 120 and so forth in the FBG device base portion 111 in the process of fabricating the FBG device 100. This is because the process of installing the FBG mount 120 and so forth in the FBG device base portion 111, for example, cannot be executed unless the FBG device enclosure cover 113 has been removed.

Both surfaces of the FBG device base portion 111 and FBG device enclosure cover 113 have been manufactured from gold-plated copper material. Naturally, such constituent elements are not limited to copper material and may instead be made from aluminum material and real brass material. The shape of the FBG device enclosure 110 is a square box, for example, and either side of which in a longitudinal direction that follows the length direction of an optical fiber 160 comprises a power supply terminal (not shown), which supplies power to a thermo module 121 (described subsequently), and an output terminal (not shown) from the temperature sensor 133.

The temperature control plate 125 is constituted by the thermo module 121 and heat-insulating member 123.

The thermo module 121 is constituted by heating and cooling modules that use peltier elements, for example. FIG. 2 shows the constitution of a temperature control portion 120 that comprises one thermo module 121 by way of example. The thermo module 121 may be arranged in a plurality in accordance with the shape and size of the base plate 132.

A low temperature conductivity material such as a glass epoxy material, PEEK material® or mica material can be used as the heat insulating member 123. Further, instead of the heat-insulating member 123, the base plate 132 may be installed so that the base plate 132 is linked and fixed, that is, is bridged to the base bottom face 112 of the FBG device enclosure 110 by means of a screw or the like made of a low thermal conductivity material. In this case, the gap between the base plate 132 and FBG device base portion 111 is insulated by means of air or by filling the inside of the FBG device enclosure 110 with urethane foam.

The base plate 132 is preferably made of copper material and the mounting plate 135 is preferably made of Invar material. The materials of the base plate 132 and mounting plate 135 are not restricted to such materials. Usage of a material with high thermal conductivity for the base plate 132 is acceptable. The thermal conductivity of the material constituting the base plate 132 is desirably a minimum of 398 W/(m·K). Further, usage of a material with a small thermal expansion coefficient for the mounting plate 135 is preferable and the thermal expansion coefficient of the material constituting the mounting plate 135 is desirably a maximum of $1.2\times10^{-6}$/K. The base plate 132 is mechanically fixed in contact with the upper face of the temperature control plate 125 by using screws or the like.

The base plate 132 comprises a temperature sensor 133. FIG. 2 shows a constitution where the temperature sensor 133 is installed embedded in the base plate 132. The temperature sensor 133 may be installed embedded in the mounting plate 135 or may be installed fixed to the side or the like of the mounting plate 135 or base plate 132. In addition, a thermistor may be used or a thermocouple or platinum thermally resistant body may be used as the temperature sensor 133.

The mounting plate 135 is provided in a state where same is capable of gliding via silicon grease to contact the upper face of the base plate 132.

An SSFBG 167 is formed in the optical fiber 160. A single mode optical fiber whose ultraviolet light sensitivity is raised by adding germanium or the like to the core, for example, is used as the optical fiber 160. The SSFBG 167 has a multipoint phase shift structure in which a plurality of FBG units **168*a* to 168*o* (also represented by 'code 168' in the following description) and phase modulation portions 169*a* to 169*n* (also represented by 'code 169' in the following description) are alternately formed extending from the side of an input terminal 166*a* of the optical fiber 160 toward the side of an output terminal 166*b*. Each of the plurality of FBG units 168 are formed with an equal length and with the same diffraction grating interval. The phase difference of the optical pulse signal reflected by each FBG unit 168 is regulated by means of the optical path length of the phase modulation portions 169 between the adjacent FBG units 168**.

Here, the optical path length of the phase modulation portions 169 is regulated by local heaters **170*a* to 170*n* (also represented by 'code 170' in the following description). The local heaters 170 are constituted by a heat element that is a tungsten wire with a diameter of 18 μm, for example. The local heaters 170 are fixed through contact or by being wrapped around in positions corresponding with the phase modulation portions 169 of the SSFBG 167. Further, the material of the local heater 170** is not limited to tungsten. Nichrome wire may also be used.

The FBG device enclosure 110 comprises a power supply terminal (not shown) for supplying power to the local heaters on either side in the longitudinal direction that follows the length direction of the optical fiber 160. The phase modulation temperature controller is electrically connected to the local heaters via the power supply terminal for the local heaters. As the phase modulation temperature controller, a commonly known temperature controller comprising a function for deciding whether to supply power to the respective local heaters 170 corresponding with each of the phase modulation portions 169, that is, which permits the heating and non-heating by the local heaters 170 to be individually controlled, is employed.

A V-shaped groove 147 is formed as an FBG contact portion 165 on the upper face of the mounting plate 135. The optical fiber 160 is fixed embedded in the V-shaped groove 147 and the optical fiber 160 and the groove surface of the V-shaped groove 147 are glued together. A first stop groove 141 and a second stop groove 143, which are orthogonal to the V-shaped groove 147, are provided in the upper face of the mounting plate 135. The parts of the V-shaped groove 147 are differentiated as a first fixing portion 161, the FBG contact portion 165, and a second fixing portion 163 by the first stop groove 141 and second stop groove 143. That is, the parts of the V-shaped groove 147 are such that the part extending from one end of the V-shaped groove 147 to the first stop groove 141 is the first fixing portion 161, the part extending from the other end of the V-shaped groove 147 to the second stop groove 143 is the second fixing portion 163, and the part extending from the first stop groove 141 to the second stop groove 143 is the FBG contact portion 165.

The optical fiber 160 is bonded with glue or adhesive to the first fixing portion 161 and second fixing portion 163. As adhesive, an ultraviolet curing-type acrylic adhesive (VTC-2 manufactured by Summers Optical, for example) or epoxy adhesive can be used. The optical fiber 160 is glued to the groove surface of the V-shaped groove 147 by means of silicon grease on the FBG contact portion 165. The optical fiber 160 is passed through the through-hole 115 formed in the FBG device base portion 111 and is sealed to the FBG device enclosure 110 by means of sealant 117. Silicon gel that is flexible even after curing may be used as the sealant 117.

In order to increase the adhesion of the optical fiber 160 to the V-shaped groove 147, local heater grooves 145 are formed in the parts where the local heaters 170 of the FBG contact portion 165 are fixed. The local heater grooves 145 are provided in a direction orthogonal to the V-shaped groove 147. Here, the width of the local heater grooves 145 is set as equal to the length of the respective phase modulation portions 169. Further, the interval of the local heater grooves 145 is set as equal to the length of each FBG unit 168.

Figure 5A:
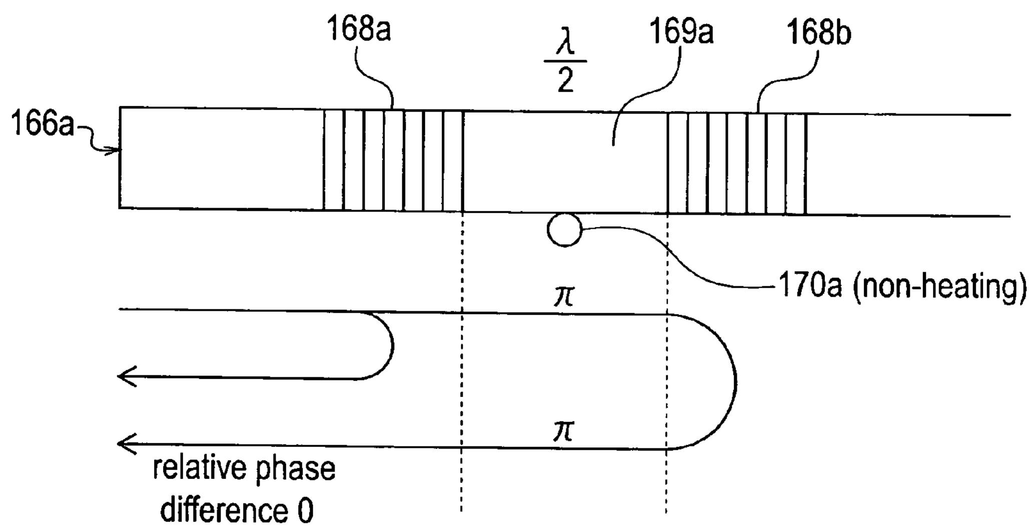
FIGS. 5(A) and 5(B) are schematic diagrams serving to illustrate difference control of reflected light of a local heater.

The operation when the FBG device of the first embodiment is used as a phase encoder will now be described with reference to FIGS. 5(A) and 5(B). FIGS. 5(A) and (B) are sketched diagram for explaining phase difference control of reflected light using the local heaters of the FBG device.

Suppose that the optical path length of the phase modulation portion 169*a* that is formed between the first FBG unit 168*a* and the second FBG unit 168*b* is $\lambda/2$ (where $\lambda$ is the wavelength of the carrier wave of the optical pulse signal) as is the case shown, for example, in FIG. 5(A). Here, the optical pulse signal that is inputted from the input terminal 166*a* and then reflected by the second FBG unit 168*b* after being transmitted by the first FBG unit 168*a* and first phase modulation portion 169*a* passes through the first phase modulation portion 169*a* before and after reflection by the second FBG unit 168*b*. Once the carrier wave has passed through the first phase modulation portion 169*a* the optical path length of which is $\lambda/2$, the phase of the carrier wave is shifted by $\pi$. As a result, the phase of the reflected light that is reflected by the second FBG unit 168*b*, which passes twice through the first phase modulation portion 169*a*, is shifted by $2\pi$ in comparison with the reflected light of the first FBG unit 168*a*. Eventually, the relative phase difference between the reflected light of the first FBG unit 168*a* and second FBG unit 168*b* is 0.

Figure 5B:
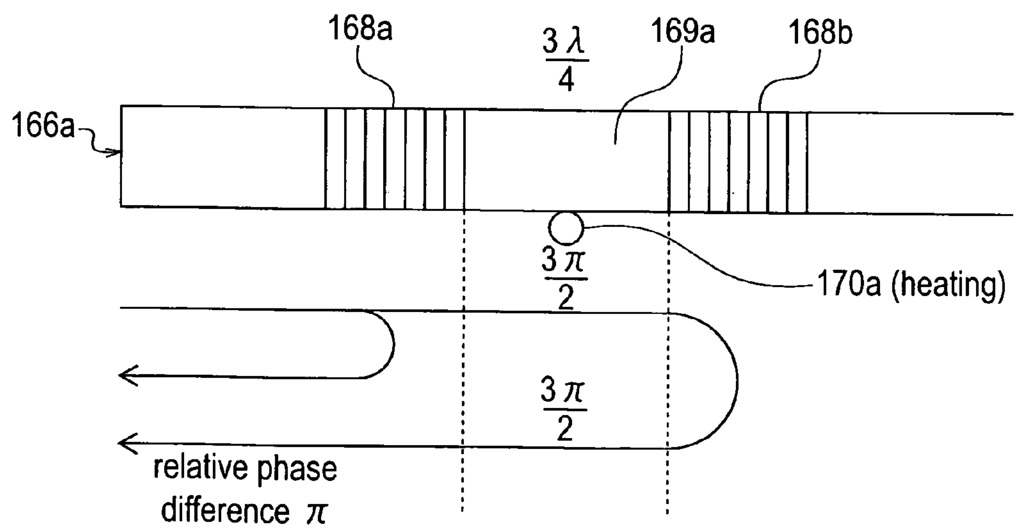

Further, in the case as shown, for example, in FIG. 5(B), the first phase modulation portion 169*a*, which is formed between the first FBG unit 168*a* and second FBG unit 168*b*, is extended as a result of the heating by the first local heater 170*a*, whereby the optical path length of the first phase modulation portion 169*a* is rendered $3\lambda/4$. Here, the optical pulse signal that is inputted from the input terminal 166*a* and then reflected by the second unit FBG 168*b* after being transmitted by the first FBG unit 168*a* and first phase modulation portion 169*a* passes through the first phase modulation portion 169*a* before and after reflection by the second FBG unit 168*b*. Once the carrier wave has passed through the first phase modulation portion 169*a* the optical path length of which is $3\lambda/4$, the phase of the carrier wave is shifted by $3\pi/2$. As a result, the reflected light that is reflected by the second FBG unit 168*b*, which passes twice through the first phase modulation portion 169*a*, has a relative phase difference with respect to the reflected light that is reflected by the first FBG unit 168*a* of $\pi$.

Thus, when the optical path length of the first phase modulation portion 169*a* is made an integer multiple of $\lambda/2$, that is, $m\lambda/2$ (m is a positive integer), the relative phase difference between each of the reflected optical pulse signals of the first FBG unit 168*a* and second FBG unit 168*b* is 0. Meanwhile, when the optical path length of the first phase modulation portion 169*a* is made an odd number multiple of $\lambda/4$, that is, $m\lambda/2+(2n-1)\lambda/4$ (n is a positive integer), the relative phase difference of the optical pulse signals reflected by the first FBG unit 168*a* and second FBG unit 168*b* respectively is $\pi$.

The SSFBG 167 of the optical fiber 160 comprises fifteen FBG units 168 and fourteen phase modulation portions 169 and is capable of encoding or decoding an optical pulse signal by means of a code example of a 15-bit M sequence. Suppose that the optical path length of all the phase modulation portions 169 is $m\lambda/2$ when all the local heaters 170 are not heating. When all the local heaters 170 are not heating, the relative phase difference between adjacent FBG units 168 is 0. Therefore, the phases of the reflected pulse signal that are reflected by the respective FBG units 168 are then ‘0, 0, 0, 0, 0, 0, 0, 0, 0, 0, 0, 0, 0, 0’.

Here, suppose that the setting of heating and non-heating by the first to fourteenth modulation portions is ‘F, F, H, F, F, F, H, H, H, H, F, H, F, H’, where heating by a local heater 170 is expressed by ‘H’ and non-heating by a local heaters 170 is expressed by ‘F’. The third local heater 170*c* that is fixed to a third phase modulation portion 169*c* is heated to extend the third phase modulation portion 169*c*. When the optical path length of the third phase modulation portion 169*c* is $m\lambda/2+(2n-1)\lambda/4$, the optical pulse signal reflected by the fourth FBG 168*d*, for example, passes twice through the third phase modulation portion 169*c* before and after being reflected. Because the phase is shifted by $\pi/2$ when passing through the third phase modulation portion 169*c*, the relative phase difference with respect to the optical pulse signal reflected by the third FBG unit 168*c* of the optical pulse signal reflected by the fourth FBG unit 168*d* becomes π as a result of passing twice through the third phase modulation portion 169*c*.

Because the third, seventh to tenth, and twelfth and fourteenth local heaters 170*c*, 170*g* to 170*j*, 170*l* and 170*n* respectively are heated, a phase variation occurs in the third, seventh to tenth, and twelfth and fourteenth phase modulation portions 169*c*, 169*g* to 169*j*, and 169*l* and 169*n* respectively. On the other hand, because the first and second, fourth to sixth, and eleventh and thirteenth local heaters 170*a* and 170*b*, 170*d* to 170*f*, and 170*k* and 170*m* respectively are not heated, a phase variation does not occur in the first and second, fourth to sixth, and eleventh and thirteenth phase modulation portions 169*a* and 169*b*, 169*d* to 169*f*, and 169*k* and 169*m*. Hence, the phases of the optical pulse signals reflected by the first to fifteenth FBG units are then '0, 0, 0, π, π, π, π, 0, π, 0, π, π, 0, 0, π' ('code A' hereinafter).

Next, the settings for heating and non-heating are changed to 'H, F, H, H, H, F, F, H, F, F, H, F, F, H'. In this case, because the first, third to fifth, eighth, eleventh, and fourteenth local heaters 170*a*, 170*c* to 170*e*, 170*h*, 170*k*, and 170*n* respectively are heated, a phase variation occurs in the first, third to fifth, eighth, eleventh, and fourteenth phase modulation portions 169*a*, 169*c* to 169*e*, 169*h*, 169*k*, and 169*n* respectively. Hence, the phases of the optical pulse signals reflected by the first to fourteenth FBG units are then 'π, 0, 0, π, 0, π, π, π, 0, 0, 0, π, π, π, 0' ('code B' hereinafter).

Figure 6A:
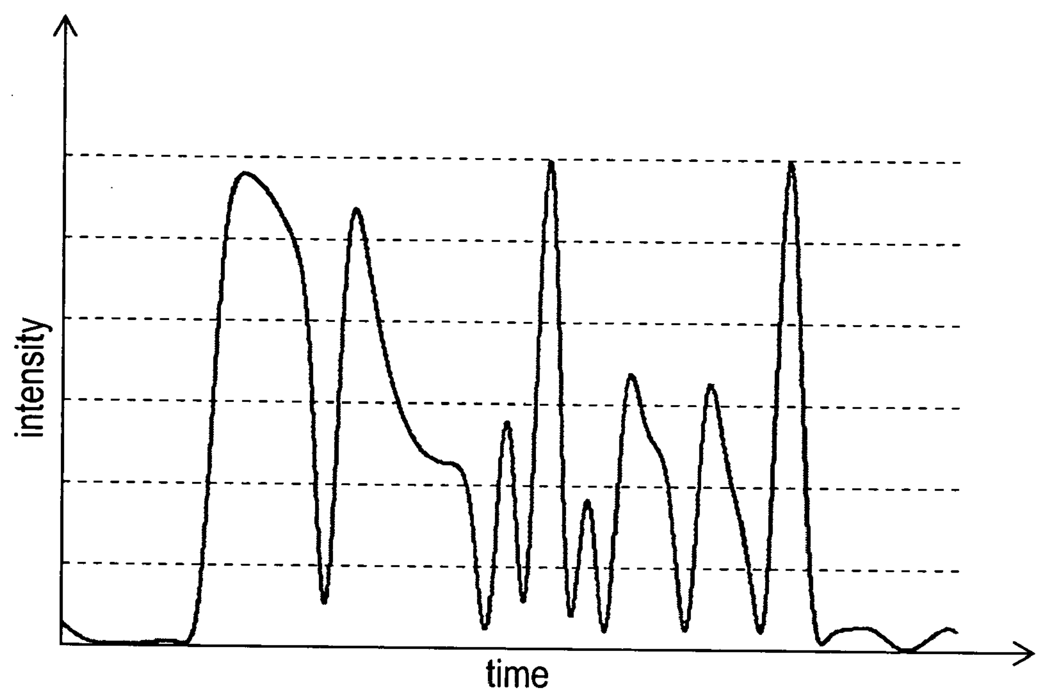
FIGS. 6(A) and 6(B) show encoded waveforms.
Figure 6B:
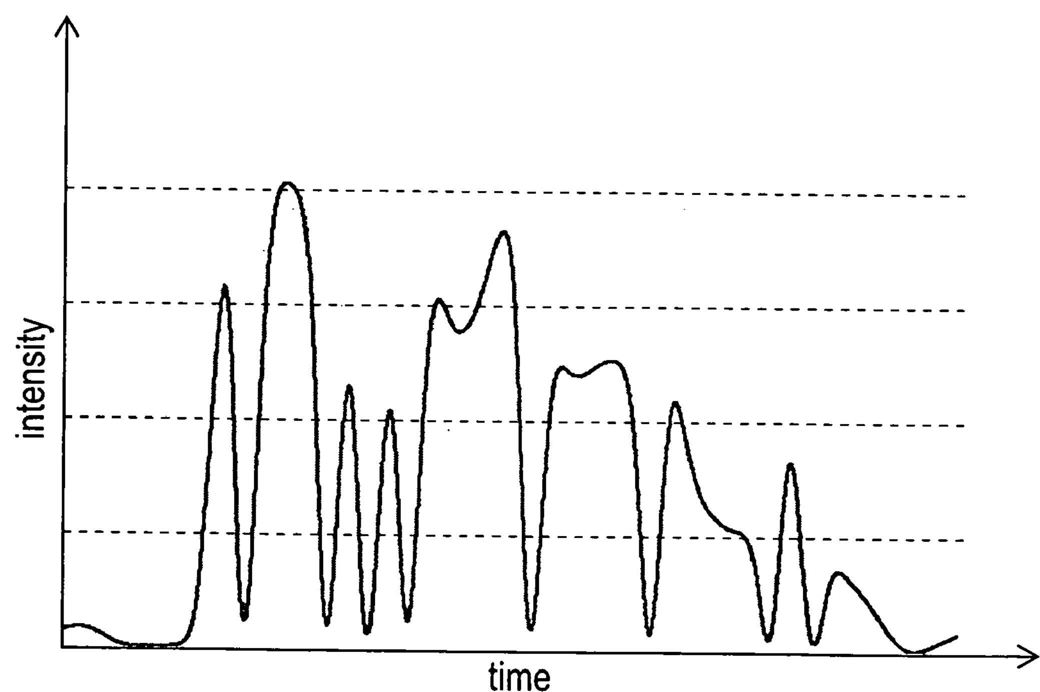

FIGS. 6(A) and 6(B) show waveforms of an encoded pulse signal in a case where an optical pulse signal is inputted to the FBG device constituting a phase encoder. In FIGS. 6(A) and 6(B), the horizontal axis represents time, and the vertical axis represents the intensity of the outputted optical pulse signal in an arbitrary unit. FIG. 6(A) shows a waveform of an encoded pulse signal that is outputted from the FBG device when an optical pulse signal is inputted to the FBG device constituting code A. Further, FIG. 6(B) shows a waveform of an encoded pulse signal that is outputted from the FBG device when the same optical pulse signal as that inputted to the FBG device constituting code A is inputted to the FBG device constituting code B.

Thus, the encoded waveforms can be made different in cases where encoding is performed by means of code A and encoding is performed by means of code B by changing the conditions for heating and non-heating by the local heaters.

Next, a set temperature is set at a predetermined value in a wavelength control temperature controller. The wavelength control temperature controller is electrically connected to the thermo module 121 via a power supply terminal that supplies power to the thermo module 121 and electrically connected to the temperature sensor 133 via the output terminal from the temperature sensor 133. The wavelength control temperature controller controls the heating or cooling of the thermo module 121 and equalizes the set temperature and measurement temperature of the temperature sensor. The mounting plate 135 is held at a fixed temperature by the control of the thermo module 121 of the temperature controller. Conventionally well-known means may be used as means for performing temperature control in order to equalize the set temperature and measurement temperature. A description of such means will be omitted here.

The mounting plate 135 is temperature-controlled as a result of the transfer of heat from the base plate 132 that is heated and cooled by the thermo module 121. Here, the base plate 132 and mounting plate 135 are in contact via silicon grease and, therefore, the expansion and contraction caused by the temperature variation of the base plate 132 is not transferred to the mounting plate 135. Further, because the mounting plate 135 is constituted by a low-thermal expansion material as mentioned earlier, the expansion and contraction of the mounting plate 135 can also be ignored. The optical fiber 160 is fixed to the mounting plate 135 constituted by a low-thermal expansion material. Therefore, only the temperature of the SSFBG 167 varies according to the temperature variation of the mounting plate 135.

Here, the FBG units 168 that are adjacent to the phase modulation portions 169 comprising the local heaters 170 are glued to the mounting plate 135. Because the thermal conductivity of the optical fiber 160 is low, the temperature of the FBG units 168 is controlled by the temperature of the mounting plate 135, that is, by the heating and cooling of the thermo module 121, and the conduction of heat to the adjacent FBG units 168 from the phase modulation portions 169 that are heated by the local heaters 170 can be ignored.

Further, when there is a change in the environmental temperature to which the encoder and decoder are exposed, the FBG device enclosure 110 expands and contracts in accordance with the variation in the environmental temperature. In this case, the expansion and contraction of the FBG device enclosure 110 is absorbed as a result of the flexibility of the sealant 117 used for part of the through-hole 115. Further, the optical fiber 160 is fixed to the mounting plate 135 with glue. For these reasons, the expansion and contraction of the FBG device enclosure 110 is not transferred to the SSFBG 167 and fluctuations in the wavelength caused by stress applied to the SSFBG 167 does not occur.

The effective refractive index neff and the grating pitch Λ of the respective FBG units 168 that constitute the SSFBG 167 vary in accordance with the temperature variation of the SSFBG 167. It is known that the fluctuation amount Δλ of the reflection core wavelength λ due to the temperature variation is provided by the following equation (see, for example, DOCUMENT 3: Andreas Othonos and Kyriacos Kalli, "Fiber Bragg Gratings", for example).

$$\Delta\lambda=\lambda\cdot\Delta T[(1/\Lambda)(d\Lambda/dT)+(1/neff)(dneff/dT)]$$

Here, ΔT is the temperature variation amount, Λ is the cycle of the cycle structure of the effective refractive index neff of the FBG unit 168, and dΛ/dT indicates the thermal expansion coefficient of the optical fiber 160. The fluctuation amount Δλ of the reflection core wavelength λ takes a positive value as the temperature rises and the reflection core wavelength λ moves toward longer wavelengths. On the other hand, if the temperature drops, the reflection core wavelength λ conversely moves toward shorter wavelengths.

For example, a following condition will be supposed. The reflection core wavelength λ is 1550 nm, the effective refractive cycle Λ of the FBG unit 168 is 535.6 nm, the thermal expansion coefficient of the optical fiber is $5.5\times10^{-7}$, the effective refractive index of the FBG unit 168 is 1.445, and variation rate (dneff/dT) of the effective refractive index neff of the unit FBG 168 is $8.6\times10^{-6}$. When the environmental temperature is changed from 25° C. to 45° C. in such a condition, the fluctuation amount Δλ of the reflection core wavelength λ is 0.185 nm and the reflection core wavelength λ is then 1550.185 nm.

Figure 7:
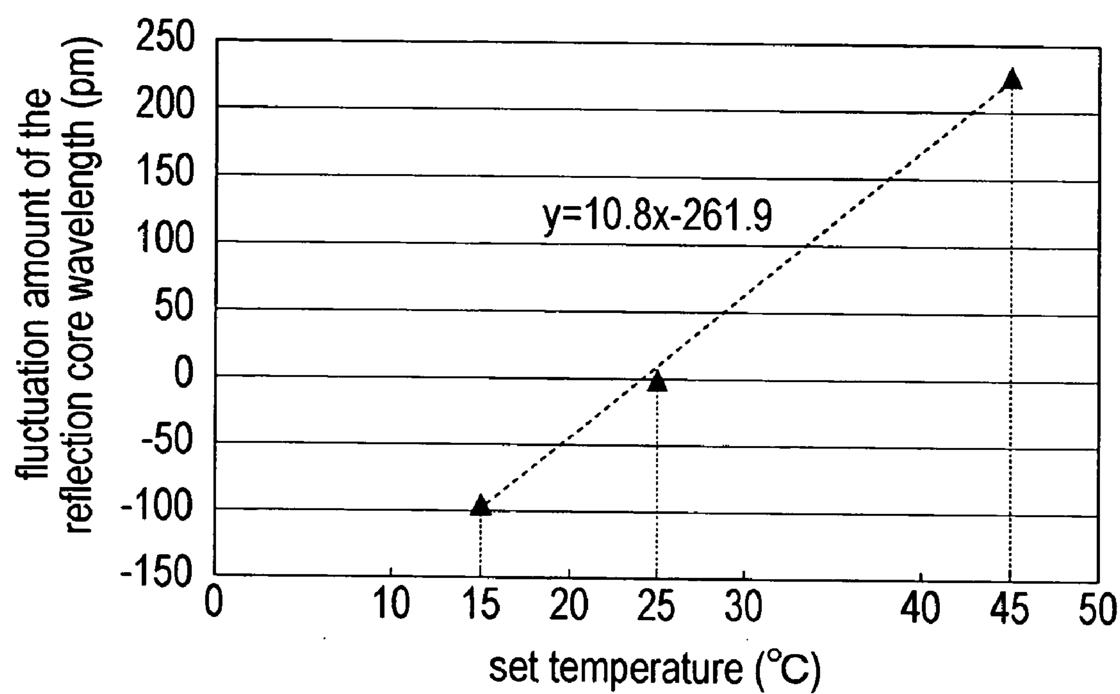
FIG. 7 serves to illustrate the wavelength adjustment characteristic of a phase encoder.

The temperature control characteristic of the first FBG device of the present invention will now be described with reference to FIG. 7. In FIG. 7, the set temperature (° C.) of the wavelength control temperature controller is plotted on the horizontal axis, the fluctuation amount Δλ (pm) of the reflection core wavelength constituting the Bragg reflection wavelength of the FBG device of the first embodiment is plotted on the vertical axis and the measurement values are indicated by black triangles. At a temperature of 15° C., the fluctuation amount is approximately −100 pm, at 25° C., approximately 0 pm and, at 45° C., approximately 230 pm. Supposing that the set temperature (° C.) of the wavelength control temperature controller is x and the fluctuation amount Δλ (pm) of the operating wavelength is y, these observation values are approximated by the following function:

$$y=10.8x-261.9.$$

It can be seen from this that the fluctuation amount Δλ (pm) of the operation wavelength for each 1° C. of the set temperature of the wavelength control temperature controller is 10.8 pm.

Further, by adjusting the environment temperature in the range 15° C. to 45° C., the operating wavelength can be adjusted in a 300 pm range. As a result, it is also possible to match the swing in wavelength of the light source generating the carrier wave that is installed on the transmission side of the OCDM, for example. If a temperature controller that allows the temperature to be set in units of 0.1° C. is used as the temperature controller, the minimum adjustment amount of the operating wavelength is approximately 1 pm.

As described above, when the fiber Bragg grating device of the first embodiment is employed as the OCDM encoder and decoder, code can be changed easily by means of the heating and non-heating of the local heaters without exchanging the encoder and decoder themselves.

Further, the fiber Bragg grating device of the first embodiment makes it possible to set the wavelength at an accuracy of 1 pm in a 300-pm range. In addition, the wavelength is not affected by variations in the environmental temperature. Therefore, the code and decoding characteristics can be provided stably for long periods on the basis of the set code.

Second Embodiment

Figure 8:
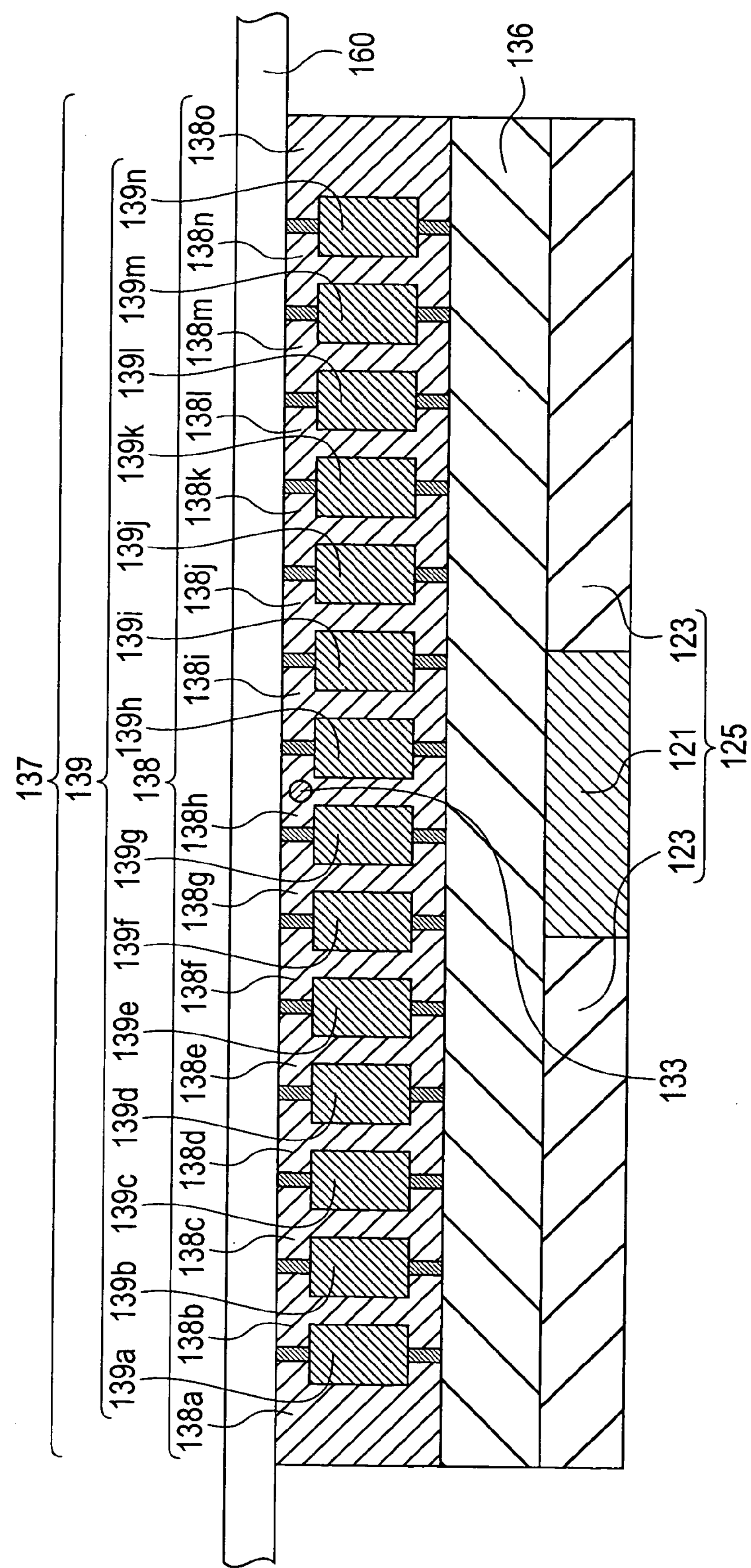
FIG. 8 is a schematic cross-sectional view of an FBG mount and FBG of a second embodiment.

The constitution of the FBG device of the second embodiment of the present invention will be described next with reference to FIG. 8. The FBG device of the second embodiment has the same constitution as that of the first embodiment except for the FBG mount and a detailed description of the FBG device of the second embodiment will therefore be omitted. FIG. 8 is a schematic cross-sectional view of the FBG mount and optical fiber of the FBG device of the second embodiment as seen from the side.

The mount of the second FBG device is constituted by sequentially stacking the temperature control plate 125, a base plate 136, and mounting plate 137.

The constitution of the temperature control plate 125 is the same as that of the first embodiment and will therefore not be described here. The base plate 136 is fixed such that the lower face of the base plate 136 is fixed in contact with the upper face of the temperature control plate 125. The mounting plate 137 is provided in contact with the upper face of the base plate 136 in a state where the lower face of the mounting plate 137 is able to glide over the upper face of the base plate 136.

The mounting plate 137 comprises a plurality of mounting stages 138*a* to 138*o* (also represented by 'code 138' in the following description) and a plurality of expansion/contraction stages 139*a* to 139*n* (also represented by 'code 139' in the following description). The mounting stages 138 are preferably made of a copper material. The material of the mounting stages 138 is not limited to copper material but is desirably constituted by a material the thermal conductivity of which is a minimum of 398 W/mK.

The boundary faces of the base plate 136 and mounting plate 137 are in contact via silicon grease. The temperature sensor 133 is provided on the mounting plate 137. FIG. 8 shows a constitution where the temperature sensor 133 is installed embedded in the mounting stages 138. The temperature sensor 133 may be provided embedded in the base plate 136 or may be installed fixed to the side or the like of the mounting stages 138. Further, a thermistor may be used or a thermocouple or platinum thermally resistant body may be used as the temperature sensor 133.

A V-shaped groove is formed on the upper face of the mounting stages 138 in the longitudinal direction thereof. The optical fiber 160 is fixed such that the optical fiber is fitted into the V-shaped groove 147 and the optical fiber 160 and upper face of the V-shaped groove 147 are glued (see, for example, FIG. 3) The length of the mounting stage 138 here is equal to the length of the FBG unit.

The respective mounting stages 138 are installed with the expansion and contraction stages 139 interposed therebetween. The expansion and contraction stages 139 are constituted by means of an expansion and contraction device that employs a piezo element, for example, and extend in the longitudinal direction of the optical fiber 160 as a result of the application of a voltage. The expansion and contraction stages 139 are established such that the interval in the longitudinal direction of the optical fiber 160 between adjacent mounting stages 138 is Mλ/2, that is, equal to the length of the phase modulation portion in a state where a voltage is not applied. Further, as a result of applying a voltage, the extension amount of the expansion and contraction stage is at least λ/4. In addition, because the application of a normal high voltage is necessary to drive an expansion and contraction device that uses a piezo element, the connecting wire between the expansion and contraction stage and phase control portion, and the expansion and contraction stage retain a state of being adequately insulated from the surroundings.

The operation when the fiber Bragg grating device of the second embodiment is used as a phase encoder will be described once again with reference to FIGS. 4, 5(A) and 5(B). Further, as an example, a case where the code is the code of a sequence M in which the code length is 15 bits will now be described.

The FBG of the optical fiber 160 comprises fifteen FBG units 168 and fourteen phase modulation portions 169. Suppose that the optical path length of the phase modulation portion 169 in a case where the voltage supplied to the expansion and contraction stage 139 is not applied is mλ/2. Therefore, the optical pulse signal that is reflected by the second FBG unit 168*b* is inputted from the input terminal 166*a* and the phase when the optical pulse signal has passed through the first phase modulation portion 169*a* after passing through the first FBG unit 168*a* is shifted by π. Further, when the optical pulse signal passes through the first phase modulation portion 169*a* once again after being reflected by the second FBG 168*b*, the phase is shifted further by π. As a result, the relative phase difference between the optical pulse signal reflected by the first FBG unit 168*a* and the optical pulse signal reflected by the second FBG unit 168*b* is 0. Likewise, when a voltage is not applied to the expansion and contraction stage 139, that is, when all the phase modulation portions have the same optical path length, the relative phase difference between adjacent FBG units is 0. Therefore, supposing that the phase of the first FBG unit 168*a* is 0, the phases of the pulse signals that are reflected by each of the FBG units are '0, 0, 0, 0, 0, 0, 0, 0, 0, 0, 0, 0, 0, 0, 0'.

Here, suppose that the setting of the application and non-application of the voltage of the first expansion and contraction stage 139*a* to fourteenth expansion and contraction stage 139*n* is 'F, F, N, F, F, F, N, N, N, N, F, N, F, N', where the application of a voltage to an expansion and contraction stage 139 is expressed by 'N' and the non-application of a voltage is expressed by 'F'. By applying a voltage to the third expansion and contraction stage 139*c* that corresponds with the third phase modulation portion 169*c*, the third phase modulation portion 169*c* is extended, whereby the optical path length of the third phase modulation portion 169*c* is set at $m\lambda/2+(2n-1)\lambda/4$. When the optical path length of the third phase modulation portion 169*c* is $m\lambda/2+(2n-1)\lambda/4$, the optical pulse signal reflected by the fourth FBG unit 168*d*, for example, passes twice through the third phase modulation portion 169*c* before and after being reflected. The phase is shifted by $\pi/2$ when passing through the third phase modulation portion 169*c*. As a result of passing twice through the third phase modulation portion 169*c*, the relative phase difference with respect to an optical pulse signal reflected by the third FBG unit 168*c* of the optical pulse signal that is reflected by the fourth FBG unit 168*d* is $\pi$.

Because a voltage is not applied to the first, second, fourth to sixth, eleventh and thirteenth expansion and contraction stages 139*a*, 139*b*, 139*d* to 139*f*, 139*k* and 139*m* respectively, a phase variation does not occur in the first, second, fourth to sixth, eleventh and thirteenth phase modulation portions 169*a*, 169*b*, 169*d* to 169*f*, 169*k* and 169*m*. Because a voltage is applied to the third, seventh to tenth, twelfth and fourteenth expansion and contraction stages 139*c*, 139*g* to 139*j*, 139*l* and 139*n*, a phase variation occurs in the first, second, fourth to sixth, eleventh and thirteenth phase modulation portions 169*c*, 169*g* to 169*j*, 169*l* and 169*n*. Hence, the phases of the optical pulse signals reflected by the first to fifteenth FBG units 168*a* to 168*o* are then '0, 0, 0, π, π, π, π, 0, π, 0, π, π, 0, 0, π' (code A).

Further, the settings for the application and non-application of a voltage are 'N, F, N, N, N, F, F, N, F, F, N, F, F, N'. In this case, because a voltage is applied to the first, third to fifth, eighth, eleventh and fourteenth expansion and contraction stages 139*a*, 139*c* to 139*e*, 139*h*, 139*k*, and 139*n*, a phase variation does not occur in the first, third to fifth, eighth, eleventh and fourteenth phase modulation portions 169*a*, 169*c* to 169*e*, 169*h*, 169*k* and 169*n*. Therefore, the phases of the optical pulse signals reflected by the first to fourteenth FBG units are 'π, 0, 0, π, 0, π, π, π, 0, 0, 0, π, π, π, 0' (code B).

The set temperature is set at a predetermined temperature in the temperature controller. The temperature controller controls the heating or cooling of the thermo module 121 and equalizes the set temperature and the measurement temperature measured by the temperature sensor. The mounting plate is held at a fixed temperature by the control of the thermo module of the temperature controller. Further, conventionally well-known means may be used for performing temperature control in order to equalize the set temperature and measurement temperature. A description of such means will be omitted here.

Further, when the environmental temperature to which the phase modulation portions are exposed varies, the FBG device enclosure expands and contracts in accordance with the variation in the environmental temperature. In this case, because the expansion and contraction of the FBG device enclosure is absorbed by the flexibility of the sealant used for the through-hole part and the optical fiber is bonded to the mounting plate, the expansion and contraction of the FBG device enclosure is not transferred to the FBG and wavelength fluctuations caused by stress acting on the FBG are not induced.

As described hereinabove, when used as an OCDM encoder and decoder, the fiber Bragg grating device of the second embodiment allows code to be changed easily by means of the application and non-application of a voltage to the expansion and contraction stage without exchanging the encoder and decoder.

Moreover, the fiber Bragg grating device of the second embodiment makes it possible to set the wavelength at an accuracy of 1 pm in a 300-pm range. In addition, the wavelength is not affected by variations in the environmental temperature. Therefore, the code and decoding characteristics can be provided stably for long periods on the basis of the set code.

What is claimed is:

1. A fiber Bragg grating device, comprising:

an FBG mount that is constituted by sequentially stacking a temperature control plate, a base plate, and a mounting plate; and a superstructured FBG (SSFBG) in which a plurality of fiber Bragg grating (FBG) units of the same constitution and a plurality of phase modulation portions are alternately formed in the same optical fiber, wherein said temperature control plate is constituted by a thermo module and heat-insulating member;

said base plate is fixed in contact with the upper face of said temperature control plate;

said mounting plate is in contact with the upper face of said base plate in a state where said mounting plate is able to glide over the upper face of said base plate;

said SSFBG is fixed to contact an FBG contact portion that is established on the upper face of said mounting plate; and said phase modulation portions are formed to be capable of expanding and contracting and, as a result of the expansion and contraction of said phase modulation portions, the phase of a carrier wave of an optical pulse signal that is propagated by said phase modulation portions can be changed.

2. The fiber Bragg grating device according to claim 1, wherein the optical path length of said phase modulation portions is set at a first length L1 provided by the following equation (1) and is capable of expanding to a second length L2 provided by the following Equation (2):

$$L1=m\lambda/2 \quad \text{Equation (1):}$$

$$L2=L1+(2n-1)\lambda/4, \quad \text{Equation (2):}$$

where m and n are positive integers and λ is the wavelength of said carrier wave of said optical pulse signal propagated by the SSFBG.

3. The fiber Bragg grating device according to claim 1, wherein each of said phase modulation portions comprises a local heater that changes the optical path length of said phase modulation portions; and said phase modulation portions expand and contract as a result of the heating and non-heating by said local heaters, respectively.

4. The fiber Bragg grating device according to claim 2, wherein each of said phase modulation portions comprises a local heater that changes the optical path length of said phase modulation portion; and said optical path length of each of said phase modulation portions is set to be L2 as a result of heating by said local heater and set to be L1 as a result of non-heating by said local heater.

5. The fiber Bragg grating device according to claim 3, wherein said FBG contact portion is provided as a V-shaped groove in the upper face of said mounting plate;

local heater grooves of width equal to the length of said phase modulation portions are provided at an interval equal to the length of said FBG unit in the upper face of said mounting plate and in the groove face of said V-shaped groove;

said local heaters are provided in said local heater grooves; and said SSFBG is provided to contact the groove face of said V-shaped groove.

6. The fiber Bragg grating device according to claim 4, wherein said FBG contact portion is provided as a V-shaped groove in the upper face of said mounting plate;

local heater grooves of width equal to the length of said phase modulation portions are provided at an interval equal to the length of said FBG unit in the upper face of said mounting plate and in the groove face of said V-shaped groove;

said local heaters are provided in said local heater grooves; and said SSFBG is provided to contact the groove face of said V-shaped groove.

7. The fiber Bragg grating device according to claim 1, wherein said mounting plate is constituted by a plurality of mounting stages and a plurality of expansion and contraction stages provided interposed between said mounting stages;

said FBG units are fixed to contact said FBG contact portion that is established on the upper face of said plurality of mounting stages; and said phase modulation portions, which are not fixed to said expansion and contraction stages, expand and contract as a result of the expansion and contraction of said expansion and contraction stages.

8. The fiber Bragg grating device according to claim 7, wherein the length of said FBG contact portion of said mounting stages is established equal to the length of said FBG unit; and the optical path length of said phase modulation portions is established at the first length L1 provided by the following equation (1) as a result of the non-application of an electric field to said expansion and contraction stage, and the optical path length is capable of expanding to the second length L2 provided by the following equation (2) as a result of the application of an electric field to said expansion and contraction stage:

$$L1=m\lambda/2 \quad \text{Equation (1):}$$

$$L2=L1+(2n-1)\lambda/4, \quad \text{Equation (2):}$$

where m and n are positive integers and λ is the wavelength of said carrier wave of said optical pulse signal propagated by said SSFBG.

9. The fiber Bragg grating device according to claim 7, wherein said FBG contact portion is provided as a V-shaped groove in the upper face of said mounting plate.

10. The fiber Bragg grating device according to claim 8, wherein said FBG contact portion is provided as a V-shaped groove in the upper face of said mounting plate.

* * * * *